(12) United States Patent
Martin et al.

(10) Patent No.: US 11,513,744 B2
(45) Date of Patent: Nov. 29, 2022

(54) METHOD AND DEVICE TO MANAGE DIFFERENT SCREENS ON A PRODUCTION LINE

(71) Applicant: DOVER EUROPE SÀRL, Vernier (CH)

(72) Inventors: Elisabeth Martin, Chatuzange-le-Goubet (FR); Mikael Palmen, Lindome (SE)

(73) Assignee: DOVER EUROPE SÀRL, Vernier (CH)

(*) Notice: Subject to any disclaimer, the term of this patent is extended or adjusted under 35 U.S.C. 154(b) by 86 days.

(21) Appl. No.: 16/500,267

(22) PCT Filed: Apr. 7, 2017

(86) PCT No.: PCT/IB2017/000536
§ 371 (c)(1),
(2) Date: Oct. 2, 2019

(87) PCT Pub. No.: WO2018/185512
PCT Pub. Date: Oct. 11, 2018

(65) Prior Publication Data
US 2021/0103413 A1    Apr. 8, 2021

(51) Int. Cl.
*G06F 3/12*    (2006.01)

(52) U.S. Cl.
CPC .......... *G06F 3/1207* (2013.01); *G06F 3/1234* (2013.01); *G06F 3/1256* (2013.01); *G06F 3/1282* (2013.01); *G06F 3/12* (2013.01)

(58) Field of Classification Search
CPC .... G06F 3/1207; G06F 3/1256; G06F 3/1234; G06F 3/1282; G06F 3/1229; G06F 3/121; G06F 3/1204; G06F 3/1208
(Continued)

(56) References Cited

U.S. PATENT DOCUMENTS 4,490,728 A    12/1984    Vaught et al.
4,584,590 A    4/1986    Fischbeck et al.
(Continued)

FOREIGN PATENT DOCUMENTS

EP    3076286 A1    10/2016

OTHER PUBLICATIONS

International Search Report for PCT/IB2017/000536 dated Jan. 5, 2018.
Written Opinion for PCT/IB2017/000536 dated Jan. 5, 2018.

*Primary Examiner* — Darryl V Dottin
(74) *Attorney, Agent, or Firm* — Pearne & Gordon LLP

(57) ABSTRACT

A printer comprising a controller to control printing operations, a 1st user interface and at least one second user interface, connection to connect the $2^{nd}$ user interface with the controller and wireless connection for exchanging data between the $2^{nd}$ user interface and the controller when the second user interface is not connected with the printer, the controller being programmed to: detect whether the $2^{nd}$ user interface is connected or not with the printer; display a different information on at least the first user interface depending on whether the $2^{nd}$ user interface is connected or not.

18 Claims, 11 Drawing Sheets

(58) Field of Classification Search
USPC .......................................................... 358/1.14
See application file for complete search history.

(56) References Cited

U.S. PATENT DOCUMENTS

| | | | |
|---|---|---|---|
| 5,605,659 A | 2/1997 | Moynihan et al. | |
| 6,325,477 B1* | 12/2001 | Coudray | B41J 2/17566 |
| | | | 347/19 |
| 7,084,998 B2* | 8/2006 | Blair | G06Q 30/08 |
| | | | 358/1.15 |
| 8,665,301 B2 | 3/2014 | Starkey et al. | |
| 2006/0242030 A1* | 10/2006 | Blanchard | G06Q 30/0641 |
| | | | 705/14.51 |
| 2011/0083076 A1* | 4/2011 | Kang | G06F 9/4415 |
| | | | 715/781 |
| 2012/0250070 A1 | 10/2012 | Sakamoto | |

* cited by examiner

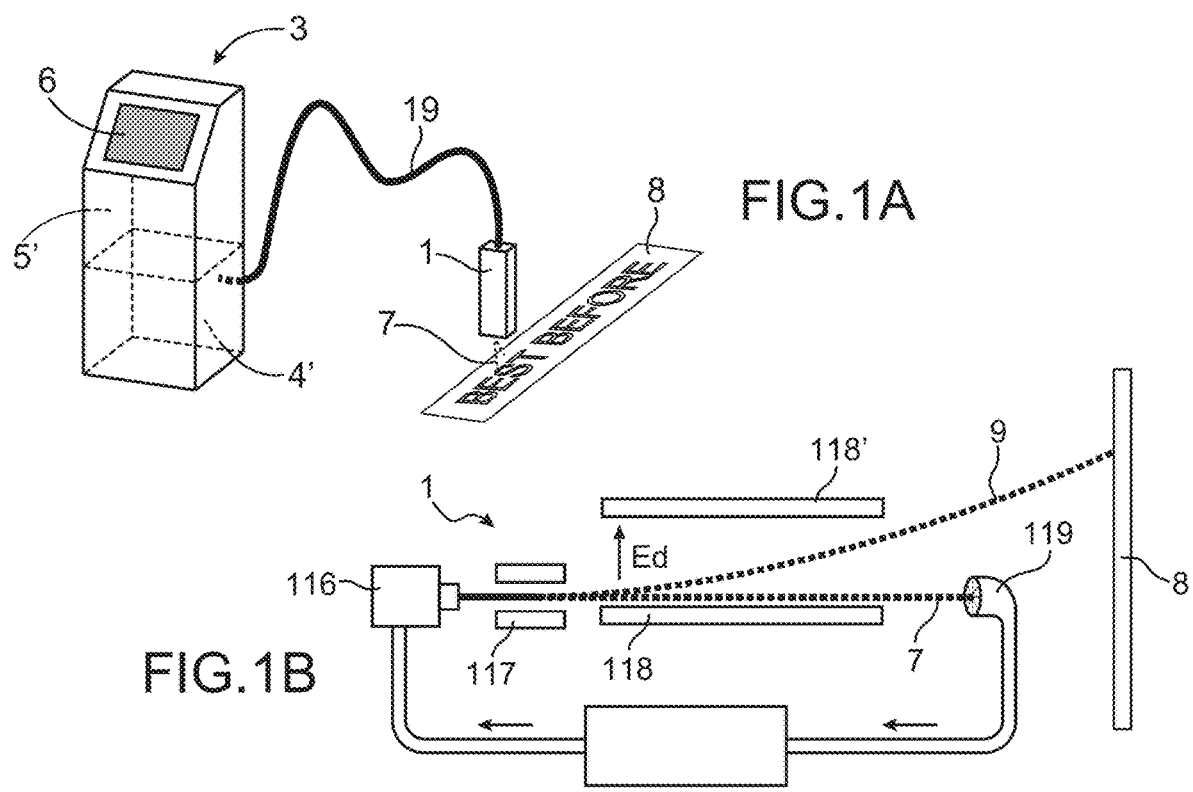
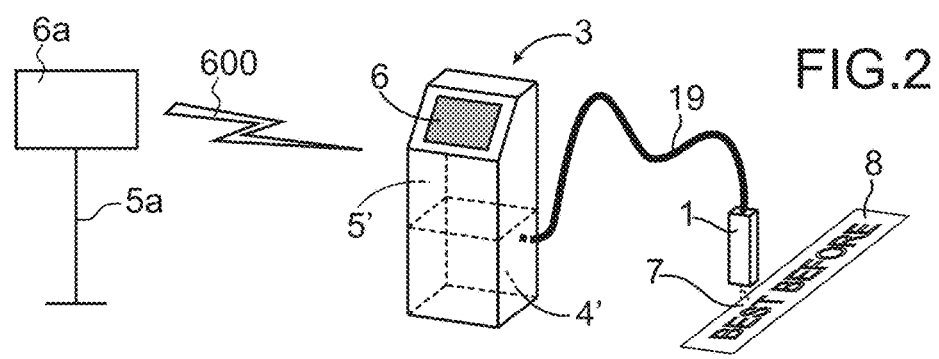
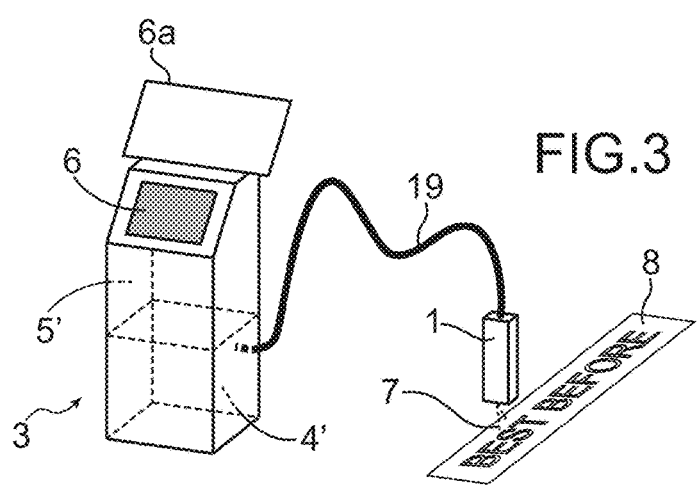

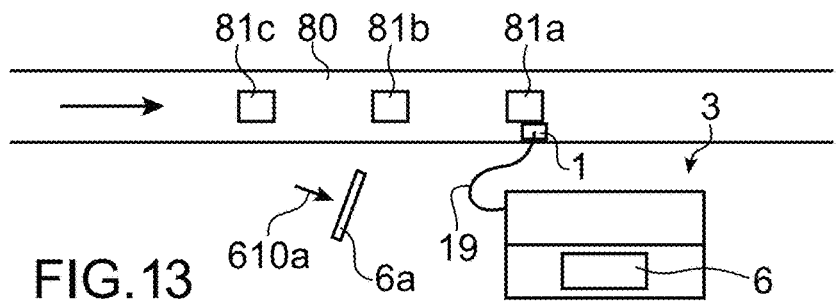
FIG.13
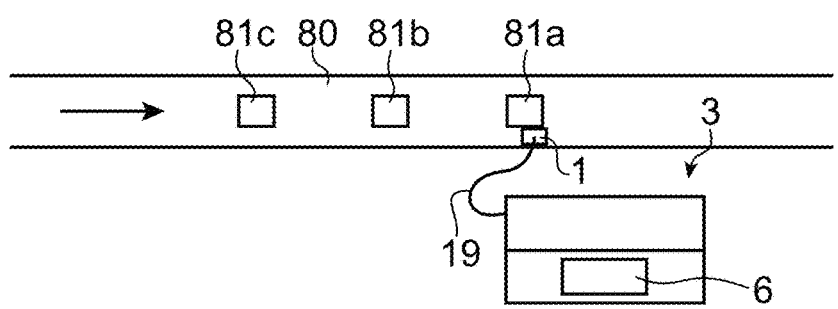
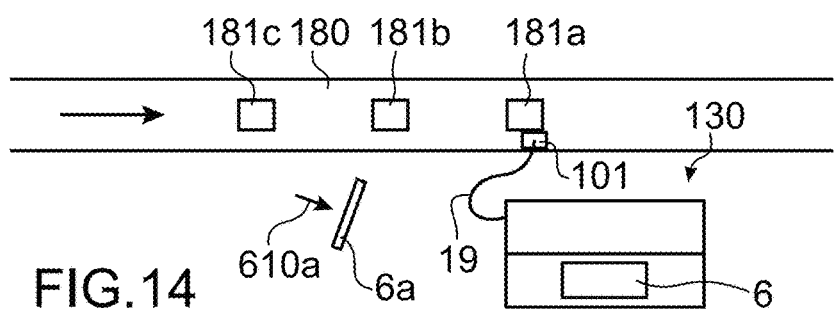
FIG.14
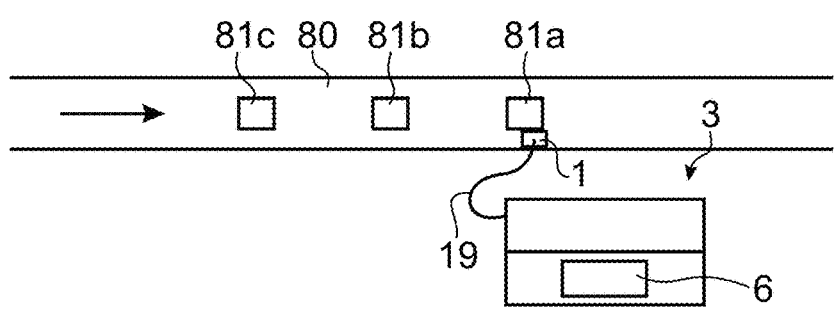
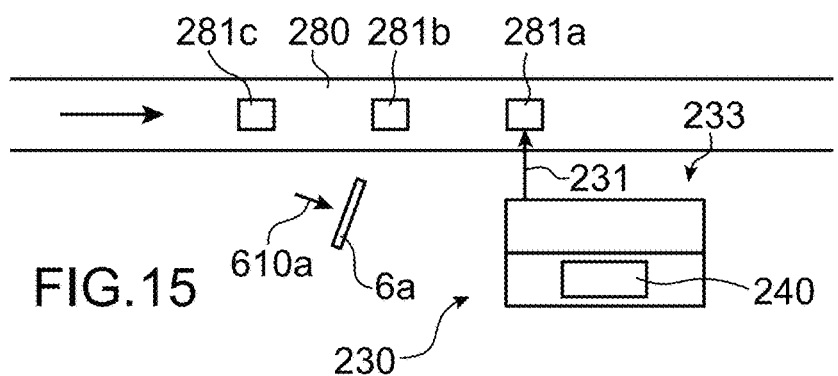
FIG.15

METHOD AND DEVICE TO MANAGE DIFFERENT SCREENS ON A PRODUCTION LINE

CROSS-REFERENCE TO RELATED APPLICATIONS

This is a National Stage application of PCT international application PCT/IB2017/000536, filed on Apr. 7, 2017, the content of which is incorporated herein by reference in its entirety.

TECHNICAL FIELD AND PRIOR ART

The invention relates to the field of industrial printers, and in particular for coding and/or marking. Different kinds of printer can be concerned, for example continuous ink jet (CU) printers. Other kinds of printers are also concerned, for example industrial laser printers or printers based on an industrial thermal transfer technology.

In an industrial printing system, an industrial printer is typically configured to print different types of information on various types of information carriers, such as the products themselves or their packaging. One example of an operation of such an industrial printer is the printing of print information data on various types of packages or goods. Commonly, such packages or goods require a great deal of product identifications and content specifications, for example, traceability data, serial numbers, time and dates of packaging, expiry dates, etc. Therefore, the print information data to be printed on the goods or on their packaging may vary from one item to the next in a batch of items, from one batch of items to another, from one site of manufacture to another, from one time of manufacture to another, from one type of print technology to another, etc.

The print information may comprise both print information data and print information instructions. The print information data may comprise, for example, references to printer ready bitmap images, such as, e.g. barcodes, or the print ready information to be printed as it is; the print information instructions on the other hand may comprise, for example, code algorithms for the printer to determine print information data on-the-fly, i.e. as it is being printed, such as, e.g. incremental enumerations, or coded instructions indicating how the print information data is to be printed on the information carrier. This print information data and instructions also conforms into a specific print information format.

Such printers are for coding and/or marking, or, more generally, for adding information, on a surface of an object or of its packaging.

In such industrial printers, the surfaces to be printed on are sometimes not flat, for example when printing must be performed directly on the surface of an object like bottles or cans or containers or cables.

Continuous ink jet (CU) printers are well known in the field of industrial coding and labelling for various products, for example to label barcodes, expiration date on food products, or to print references or distance marks on cables or pipes directly on the production line and at a high rate. This kind of printer is also found in some fields of decoration where the graphic printing possibilities of the technology are exploited.

CIJ printers have several standard sub-assemblies as shown in FIG. 1A.

First, a printing head 1, generally offset from the body of the printer 3, is connected thereto by a flexible umbilical 19 joining the hydraulic and electrical connections required for operating the head by imparting it flexibility which facilitates integration on the production line.

The body of the printer 3 usually contains three sub-assemblies:

- an ink circuit at the lower portion of said body (zone 4'), which enables, on the one hand, ink to be provided to the head at a stable pressure and with a suitable quality, and, on the other hand, the jet ink not used for printing to be accommodated;
- a controller located at the upper portion of said body (zone 5'), capable of managing the action sequencing and performing processes enabling different functions of the ink circuit and of the head to be activated. The controller 5 can include for example a micro-computer or a micro-processor and/or one (or more) electronic board and/or at least one embedded software, the programming of which ensures driving the ink circuit 4 and the printing head 1. This controller allows the printing instructions to be transmitted to the head but also the system engines and valves to be driven in order to manage supplying ink and/or solvent to the circuit with as well as recovering the ink and air mixture from the head. It is thus programmed to that end,
- an interface which gives the operator means for implementing the printer and to be informed about its operation.

In other words, the body includes 2 sub-assemblies: at the upper portion, the electronics, the electric supply, and the operator interface, and at the lower portion, an ink circuit providing pressurised ink, with a rated quality, to the head and the trough for recovering the ink not used by the head.

FIG. 1B schematically represents a printing head 1 of a CIJ printer. It includes a drop generator 116 fed with electrically conducting ink, pressurised by the ink circuit.

This generator is capable of emitting at least one continuous jet through a small dimension port called a nozzle. The jet is transformed into a regular succession of drops having an identical size under the action of a periodical stimulation system (not represented) located upstream of the nozzle outlet. When the drops 7 are not for printing, they are directed to a gutter 119 which recovers them in order to recycle unused ink to bring them back into the ink circuit. Devices 117, 118, 118' placed along the jet (charging and deflection electrodes) enable, by a command, the drops to be electrically charged and deflected in an electric field Ed.

Consequently, they are deviated from their natural trajectory of ejection from the drop generator. The drops 9 for printing avoid the gutter and will be deposited on the medium to be printed 8.

This description can be applied to so-called binary or multi-deflected continuous jet versions of continuous ink jet (CU) printers. The binary CIJ printers are equipped with a head the drop generator of which has a multitude of jets, each drop of a jet can only be oriented to 2 trajectories: printing or recovery. In multi-deflected continuous jet printers, each drop of a single jet (or of some spaced jets) can be deflected to various trajectories corresponding to charging commands being different from one drop to the other, thus making a sweeping of the zone to be printed along a direction which is the deflection direction, the other sweeping direction of the zone to be printed is covered by relatively displacing the printing head and the medium to be printed 8. Generally, the elements are arranged such that these 2 directions are substantially perpendicular.

An ink circuit of a continuous ink jet printer enables, on the one hand, ink under a controlled pressure, and possibly solvent, to be provided to the drop generator of the head 1 and, on the other hand, a trough to be created to recover unused fluids for printing and which then come back from the head.

It also enables consumables (ink and solvent, delivery from a reservoir) to be managed and ink quality (viscosity/concentration) to be controlled and maintained. Ink is a consumable also in the case of printers of the "valvejet" type.

Finally, other functions are related to the user comfort and the automatic takeover of some maintenance operations in order to ensure a constant operation regardless of the conditions of use. Among these functions, there are the solvent rinsing of the head (drop generator, nozzle, gutter), preventive maintenance head, for example replacing components having a limited lifetime, in particular filters, and/or pumps.

These different functions have very different purposes and technical requirements. They are activated and sequenced by the printer controller which will be all the more complex as the number and sophistication of the functions are great.

The above example concerns a CIJ printer, but other printer technologies are also concerned by the invention, for example industrial laser printers. An industrial laser printer has a laser source and mirrors but does not have any ink or solvent management system nor any hydraulic connection. In other technologies, use is made of a thermal ribbon, which is then the consumable material. An industrial laser printer Different functions are also fulfilled by other kinds of printers where consumables can be different from ink. A ribbon is the consumable material in the case of a "print and apply" printer or of a "TTO" printer. A laser source of an industrial laser printer directly engraves a mark in a material or burns the material to mark it (to the difference with an office or desk printer, which has a drum and a toner). The laser tube has a limited life time, which can be compared to a print head which wears out, but, as such, is not a consumable. When the laser «engraves/burns» it creates dangerous fumes/particles. A fume extractor usually has a filter which needs to be replaced and which is a consumable material.

Furthermore, an industrial printer can be integrated in a single cabinet or be split up between several boxes or cabinets where for example the print head, controller, consumables supply are in separate boxes or cabinets. This is in particular the case when a printer is used with a packaging machine.

In a known approach, a printer, for example of one of the type discussed above, has a user interface which is fixed with respect to the printer body or controller, preventing an operator to go away from the controller while still having the information being displayed on the user interface. Going away from the controller can sometimes be necessary to check a printing head or a conveyor transporting objects to be printed. In such case the operator can miss important information, for example a failure or a warning information.

Another situation concerns a printer system comprising several printers, which can operate at the same time, the operator having to move from one printer to another printer. This kind of situation can be encountered when several printers are implemented or integrated in a same packaging line or production line. In such a situation, the operator cannot, at the same time, move away from the controller and still be aware of the information being displayed on the user interface, in particular of the technical information relating to the printer. For example, several printers or print heads are managed in some systems of the TTO type ("Thermal Transfer on line"), or of the LCIJ type ("Large Character Ink Jet").

There is also a need, in such case, for displaying information relating to one or the other of the printers depending, for example, on the position of an operator with respect to both printers.

Furthermore, in a same system comprising several printers, the different printers can be of different types, for example one CIJ printer and one laser printer. There is a need, in such case, for displaying an information adapted to the printer concerned, for example the printer which is the closest to the operator or the printer selected by the operator.

SUMMARY OF THE INVENTION

The invention first concerns a printer comprising a controller to control printing operations, a 1st user interface and at least one $2^{nd}$ user interface, means to connect the $2^{nd}$ user interface with the controller and wireless means for exchanging data between the $2^{nd}$ user interface and the controller when the second user interface is not connected with the printer, said controller being programmed to:
  detect whether the $2^{nd}$ user interface is connected or not with the printer;
  display a different technical information on at least the first user interface depending on whether the $2^{nd}$ user interface is connected or not.

The invention also concerns a method to work a printer comprising a controller to control printing operations, a 1st user interface and at least one second user interface, means to connect the $2^{nd}$ user interface with the controller and wireless means for exchanging data between the $2^{nd}$ user interface and the controller when the second user interface is not connected with the printer, said method comprising:
  detecting whether the $2^{nd}$ user interface is connected or not with the printer;
  displaying a different information on at least the first user interface depending on whether the $2^{nd}$ user interface is connected or not.

The invention also concerns a method to control printing operations, implementing a printer or a printer system according to the invention, in particular as disclosed in this application.

The information, or the technical information, to be displayed, relates to a printer: it is or it comprises information relating to technical features of said printer and/or its status and/or a printing being (or to be) performed by said printer.

A printer or a printing system or a method according to the invention can embody or make use of one or more of the following features, preferably based on the controller being programmed to implement one or several of them.

Preferably the adaptation and/or the display of information is performed automatically, depending on the print technology detected (for example CIJ, or Laser, or TTO, . . . ).

In an embodiment "connected with" means "plugged with": in this embodiment the $2^{nd}$ user interface connected with (respectively "disconnected from") the controller means that the $2^{nd}$ user interface is plugged with (respectively "unplugged from") the controller.

The expression "connected with" therefore generally encompasses both cases:
  where there is a physical connection between the devices through a plug or a cable (to establish an electrical connection between the devices);
  and where the devices are wireless connected, for example using a pairing process (for example: bluetooth pairing, see https://en.wikipedia.org/wiki/

Bluetooth#Pairing_and_bonding); in this case there can be a disconnection by pairing to another device or by manually disconnecting.

When the $2^{nd}$ user interface is connected with the controller, the 1st user interface can display a different or a modified content or information with respect to the situation when the $2^{nd}$ user interface is disconnected from the controller: when the $2^{nd}$ user interface is connected with the controller, a $1^{st}$ set of technical information displayed on the $1^{st}$ user interface is changed or adapted by the controller, so that a 2nd set of technical information, different from the $1^{st}$ one (displayed when the $2^{nd}$ user interface is disconnected), is displayed on the $1^{st}$ user interface.

Instead of displaying the same (redundant) information on several user interfaces said information and/or user interface function(s) can be dynamically allocated to the different user interfaces. As an example a local user interface (or $1^{st}$ user interface) could display information, like one or several button(s) or means or icon(s), for performing one or several functions like test printing, and/or print quality control and/or warning or fault signals and/or information about consumable (for example: nature of said consumable material and/or remaining quantity of said consumable material) while the other user interface (or $2^{nd}$ user interface) does not display this information or these elements or buttons or means. Thus only the information needed, respectively on the $1^{st}$ user interface and on the $2^{nd}$ user interface is displayed respectively on the $1^{st}$ user interface and on the $2^{nd}$ user interface.

Here and in the rest of this description, "button" can be considered as also encompassing "pictograms" or "icons" or any kind of visual information or means to give the operator an opportunity or possibility to interact with the user interface in order to trigger a process or any action, in particular one of the kind disclosed in this application, with the help of the user interface.

A printer according to the invention can comprise, or a method according to the invention can implement, two or more user interfaces, a $1^{st}$ user interface being for example embedded in, or fixed with respect to, the printer, or its controller, and allows dynamic adaptation of the content of the user interfaces based on the position of the $2^{nd}$ user interface with respect to the $1^{st}$ user interface or to the controller or to the printer.

For example, the 1st user interface can display, in particular when the $2^{nd}$ user interface is connected with the controller, a printer status beacon or information and/or an information relating to the state of the printer and/or a local start and/or stop button and/or an information relating to a consumable and/or an information relating to maintenance intervals.

In a further example, the 1st user interface can display, in particular when the $2^{nd}$ user interface is connected with the controller:

one or more printer status shortcut button(s) for direct access of at least a specific printer technical function on the $1^{st}$ user interface or on the $2^{nd}$ user interface;

and/or a printer identification number or reference to support device pairing or it can display all user interface identifications which can be used to control the printer to support device pairing. "Pairing" means that both devices are given the information to have an agreed connection to exchange data. Once paired, each of them, and/or the controller, has an information about the other device with which data is possibly to be exchanged and/or between each device and the controller (with which data is possibly to be exchanged). In an embodiment, an automatic pairing can be performed when the $2^{nd}$ device is plugged; in other embodiments, for example in a network of user interfaces or in wireless communication between at least one user interface and a controller or at least one other user interface, a pairing button or field or icon can be clicked on to select another user interface to pair with and to start a pairing process;

and/or a warning signal or information or a fault signal or information;

and/or control means or zones to adjust print parameters and/or print quality, for example to adjust location of a drop, and/or drop size, and/or any other parameter relating to the drop path from a nozzle to a substrate to be printed;

and/or production information such as production rate, and/or remaining prints, and/or total prints and/or prediction or estimation of a remaining time before refilling consumables or doing maintenance;

and/or one or more of the screens can act as a combined unit, providing one part of information being displayed on the 1st user interface and another part of information, different from the first part, being displayed on at least one of the 2nd user interface.

In a further embodiment, one of the user interfaces, for example the $2^{nd}$ user interface, has a button, or means, for an operator to trigger a "pairing" with another user interface, for example the $1^{st}$ user interface, in particular in a situation where the $2^{nd}$ user interface is not connected.

The 1st user interface (a touch panel for example) can be used as a remote access display and trackpad remote user interface. For example the 1st user interface can be used like a «trackpad» for the second user interface.

One or more of the above information can be particularly useful when the $2^{nd}$ user interface is connected with the controller and shows other technical information or data (different from the technical information or data on the $1^{st}$ user interface), for example related to the production or the printing itself.

The invention solves in particular the problem of printer operation, and/or maintenance and/or service when a printer is integrated in a line, for example a packaging line; the control of the printer or of the line can be performed by an operator who is away from the $1^{st}$ user interface but who has the $2^{nd}$ user interface in hands or on a support in front of him.

The invention is further to make the operation of the printer and a printing or packaging line more efficient, reducing the number of user interface navigation steps the operator has to do. The invention provides context and location based functions to each user interface. The invention makes adapted information relating to the printer or printing or packaging line visible to an operator or to which an operator is close.

In a printer according to the invention, the controller can be programmed to display on the 1st user interface, when the $2^{nd}$ user interface is disconnected from the printer, at least part of the information displayed on the $2^{nd}$ user interface.

The controller can further be programmed to display on the 1st user interface, when the $2^{nd}$ user interface is connected with the printer, only part of the information displayed on the $2^{nd}$ user interface, said part of the information being for example displayed with a different size on the 1st user interface and on the $2^{nd}$ user interface. Numerous examples of such an information displayed on the 1st user interface have been given above.

In another embodiment, the controller is programmed to display on the 1st user interface, when the $2^{nd}$ user interface is connected with the printer, at least one different information than the information displayed on the $2^{nd}$ user interface. Again numerous examples of such an information displayed on the 1st user interface have been given above.

The information on the $1^{st}$ user interface can be therefore adapted when the $2^{nd}$ user interface is connected with the printer, so that the same information or data available on the $2^{nd}$ user interface is not displayed at the same time on the $1^{st}$ user interface, providing more display area and clearer information and data.

In a further embodiment, the controller is programmed to display on the $2^{nd}$ user interface an information relating to at least one consumable material, the 1st user interface displaying how to replace said consumable material or at least one part of the printer containing said consumable material. Said consumable material can be ink or solvent or a part of the printer, for example a valve or a pump of a hydraulic circuit of the printer.

In a further embodiment, when the printer is not printing, in particular when power is off, the controller or the $2^{nd}$ user interface can be programmed to display information, for example one or several button(s) or pictogram(s) or means, on the $2^{nd}$ user interface, to perform safety maintenance, for example to change a part of the printer. This information can also be displayed on the $2^{nd}$ user interface from a server, different from the controller of the printer, the $2^{nd}$ user interface being connected with said server.

In an exemplary embodiment, the controller can be programmed to display on the $2^{nd}$ user interface an information relating to, or coming from, at least one imaging device or machine vision system or vision camera or vision system, to image a printing made or being made, and to display on the 1st user interface images made or obtained with such an imaging device or camera or system of a printing made or being made. The 1st user interface may further display zones or buttons or pictograms or means to adapt parameters (for example print position, and/or laser power and/or laser dwell time and/or ink drop size and/or ink bleed control) of the printing being made, based on the image displayed on the $2^{nd}$ user interface. One of both user interfaces may display a button or an icon to trigger a process, for example a training (for example: a vision camera training), to improve the recognition of the printed characters or, more generally, of the pieces of information, and/or to define a zone where each character or, more generally, each piece of information, is expected. This is another example of dynamically allocating functions to two different user interfaces.

The $1^{st}$ user interface can also show a history of captured images of former printings. This is in particular the case when the system makes use of a vision camera, which captures and memorizes an image of each print.

While one of the user interfaces, for example the $1^{st}$ user interface, shows an image of what is printed or is being printed, the other user interface, for example the $2^{nd}$ user interface, can show other information or data, for example consumables refill prediction, and/or an event log and/or printer efficiency.

The printer or the industrial printer (which means no office or home printer) can be a continuous inkjet printer or a laser printer, or a thermal inkjet printer or a "print and apply" printer or a drop on demand printer or a valvejet printer. Any of these technologies can be implemented in an industrial printer.

The invention also concerns a printer system, or a method implementing such a system, comprising at least a $1^{st}$ printer and a $2^{nd}$ printer, each of them being a printer, preferably according to the invention, in particular as disclosed above, said $2^{nd}$ user interface being common to both printers and displaying an information relating to the $1^{st}$ printer, respectively to the $2^{nd}$ printer, when it is closer to said $1^{st}$ printer, respectively to said $2^{nd}$ printer.

In such a printer system, said $1^{st}$ printer can be different from said $2^{nd}$ printer. This includes any embodiment where both printers are of different natures. For example one printer is one of a continuous inkjet printer, a laser printer, a thermal inkjet printer, a "print and apply" printer, a drop on demand printer, a valve-jet printer; the other printer is also one of the same list, but is different. In one particular example one printer is a CIJ printer while the other is a laser printer or a thermal printer.

Whatever the configuration, a $2^{nd}$ user interface can be successively connected to different printers or can be used to operate a same printer from different locations, e.g. on two sides of a conveyor to provide access on both sides. According to an embodiment, a method to control printing operations implements a printer according according to any embodiment described in this application, or a printer system according to any embodiment described in this application.

A method according to the invention may comprise adapting or updating at least one information displayed on the $1^{st}$ user interface from the $2^{nd}$ user interface.

A printer or several printers according to the invention can form part of a packaging machine.

The present invention improves the efficiency of operating a printer or a printing or a packaging line comprising a printer by providing a faster and easier access to operate the printer, which reduces the down time. It also improves the efficiency by supporting an efficient location of the remote user interface to operate the printer(s).

BRIEF DESCRIPTION OF THE DRAWINGS

FIGS. 1A and 1B show a known CIJ printer and print head structure.

FIG. 2 shows a CIJ printer with a $1^{st}$ user interface and a $2^{nd}$ user interface unplugged from the printer body.

FIG. 3 shows a CIJ printer with a $1^{st}$ user interface and a $2^{nd}$ user interface plugged on the printer body.

FIG. 13 shows a conveyor with a printer body and a $1^{st}$ user interface and a $2^{nd}$ user interface unplugged from said printer body.

FIG. 14 shows 2 conveyors, each with its printer controller and its $1^{st}$ user interface, and a $2^{nd}$ user interface common to both printers.

FIG. 15 shows 2 conveyors, each with its printer controller and its $1^{st}$ user interface, and a $2^{nd}$ user interface common to both printers, both printers being different from each other.

DETAILED DESCRIPTION OF SPECIFIC EMBODIMENTS

In this specification, most of the examples are given with a CIJ printing machine. However, as explained below, other type of printing (or marking and/or coding) machines can be implemented in the frame of the invention, for example a laser printer, in order to print or mark a message or a code or, more generally, a piece of information.

The printer can be integrated into a packaging machine.

The printers concerned are industrial printers, for example which have the ability to print on surfaces which are not flat, for example cables or bottles or cans. Another aspect of such printers is that the distance between the printing head and the substrate which must be printed is higher than in conventional desk printers. For example that distance is at least between 4 mm and 5 mm for a CIJ printer. It is of course much longer for a laser printer.

Another aspect of such printers is their speed: their maximum speed is up to 10-15 m/s.

Another aspect of such printers is that they can print on very different surfaces, for example glass, or metal or blisters or packaging materials.

One aspect of the invention is disclosed in connection with FIGS. 2 and 3.

In FIG. 2 the closet or the controller 3 (the expression "controller" will be used throughout this specification but covers both alternatives) of the printing machine comprises a 1st user interface 6 which is a tool for an operator to manage the printer, for example by entering control data and/or at least one instruction, and to be informed about its operation.

This 1st user interface comprises a screen (the 1st screen) where technical information regarding the status of the machine and/or a message (and/or information) to be printed and/or a filling information of an ink and/or solvent cartridge (more generally: of a consumable material) can be displayed in several different fields.

This 1st user interface is mechanically connected to the controller so that it cannot be displaced away from the controller. It can be fixed to the controller. It can be rotatable around an axis or movable along an axis, any of said axis being fixed with respect to the controller but it remains mechanically connected to the controller. An operator can see the information displayed on this $1^{st}$ user interface and, depending on said information, interact with the machine as explained below when staying in front of the controller.

The $1^{st}$ user interface can receive from the controller one or more data or information to be displayed and/or send to the controller, or provide it with one or more data or instruction for example further to the operator's selection of a particular button of the $1^{st}$ user interface or of the $2^{nd}$ user interface, for example a "stop" button.

This 1st user interface can display different fields and/or buttons.

Figure 4A:
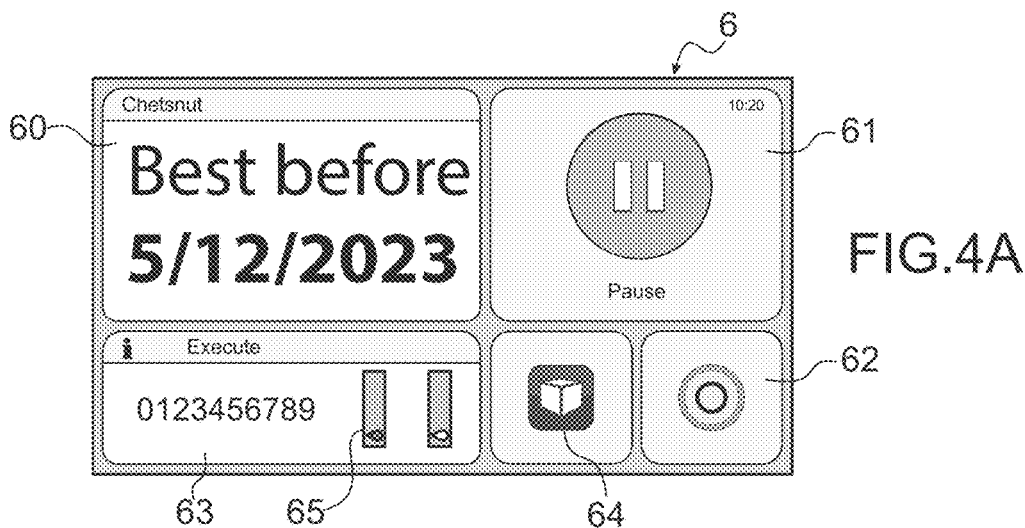
FIGS. 4A and 4B, respectively 5A and 5B, respectively 6A and 6B, are examples of a display of information on a $1^{st}$ user interface and a $2^{nd}$ user interface when the $2^{nd}$ user interface is unplugged from the printer body.

In one example of one embodiment of the $1^{st}$ screen, illustrated on FIG. 4A:

a field 60 displays the information to be printed, a button 61 displays a «pause» message or symbol while the machine in printing; selecting this button, an operator will interrupt the printing operations with a possibility to resume printing by selecting another button (not shown on FIG. 4A but it can be displayed after the button 61 has been pressed) while the machine is temporarily not printing;

another button 62 displays a «stop» message or symbol while the machine is printing; selecting this button, an operator will stop the printing operations;

another field 63 of the screen may display a number of printings or of messages already printed by the printing machine and/or an information about the quantity of consumable remaining, for example a quantity of ink and/or solvent and a possible remaining time of use before replacing of refilling a cartridge or a reservoir of the corresponding consumable; other examples of consumables are given below and an information relating to them can be displayed on this $1^{st}$ screen;

another button 64 can display a symbol or message to give the operator access to one or several tools, like for example a log and/or a diagnostic (in case of a failure of a part of the device for example), and/or one or more settings, and/or data transfer, and/or a calendar . . . .

The $1^{st}$ screen may display one or several buttons which the operator can select to change a work flow of the printer or to change the status (for example: working or stopped) of the printer.

This 1st interface therefore gives an operator a certain number of technical information, some of them giving him the possibility to interact with the work flow of the printer, for example by stopping the printer or by selecting specific tools or functions.

As illustrated on FIG. 2, a $2^{nd}$ user interface 6a, which may also comprise a screen (the $2^{nd}$ screen), is movable or portable with respect to the controller, unlike the $1^{st}$ user interface 6. It can be displaced by an operator at some distance from the controller, while still displaying the same information. The distance between the printing head or the $2^{nd}$ user interface and the controller (and the $1^{st}$ user interface) can be of the order of several meters, for example between 2 m and 10 m or 15 m.

Said $2^{nd}$ user interface 6a can display the same type of information as the 1st user interface and/or another information not displayed on the 1st user interface. The above description and the above list of information are therefore examples also applicable to the $2^{nd}$ user interface and will not be repeated. However, the same information needs not be displayed on both user interfaces. For example, and in particular if the $2^{nd}$ user interface is larger the 1st user interface, more technical information can be available on said $2^{nd}$ user interface.

Figure 4B:
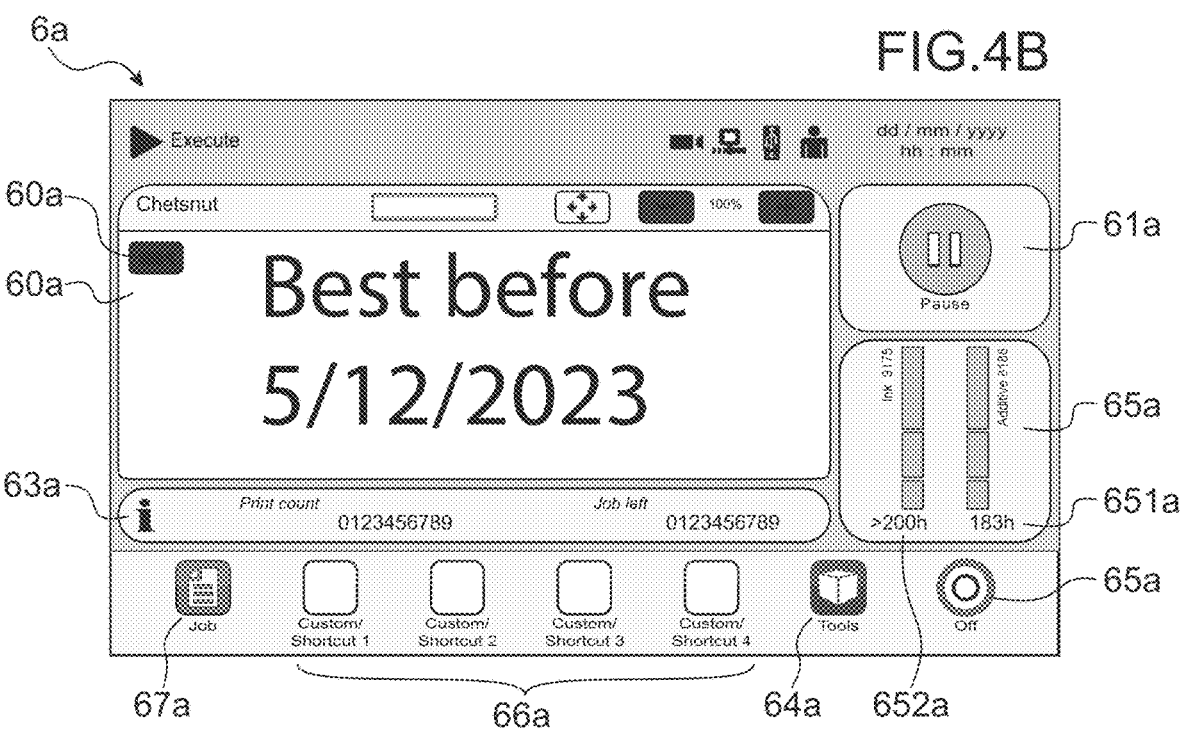

For example, as illustrated on FIG. 4B, the $2^{nd}$ user interface not only displays the information or fields displayed by the 1st user interface but further displays the number of printings remaining to be made («Job left», 630a) and a button 67a ("Job") gives access to more detail about the printing being currently performed.

On FIG. 4B, buttons and fields 61a, 62a, 64a, 60a display the same information as information and fields 61, 62, 64, 60 of FIG. 4A; but, with respect to FIG. 4A, further information is displayed, for example the information concerning the time 651a, 652a remaining before a consumable product is partly or totally consumed. On FIG. 4B, reference 651a, respectively 652a, is the remaining time before an ink cartridge, respectively a solvent cartridge, must be replaced. This information is displayed in a field 65 also including a pictogram for each of the consumable level in each of the ink and solvent cartridges. The screen of FIG. 4A displays only the pictograms 65 for each of the consumable level, not the information about the remaining time. Another information relating to a consumable can be a lifetime of a hydraulic and/or mechanical part and/or an electrical part of the printer, for example a valve or a pump of a hydraulic circuit of the printer. In this case, the pictogram can represent the corresponding part together with an information relating to an estimated remaining lifetime of said part.

Buttons, or fields or icons, for example custom or Shortcut buttons 66a, are not present on screen 6 of FIG. 4A, which has a smaller size than the screen of FIG. 4B. But the smaller screen 6 can have a button or a field or an icon to access one or more buttons or fields or icons not displayed on screen 6.

This $2^{nd}$ user interface is equipped with wireless communication means, for example an RFID or a WiFi or a Bluetooth type interface, that can allow a wireless dialogue or exchange 600 (see FIG. 2) of information or data with the printer controller 3, particularly to receive from it one or more data to be displayed and/or to send it, or provide it with, one or more data or instruction sent further to the operator's selection of a particular button of the $2^{nd}$ user interface, for example a "stop" button.

In an embodiment this $2^{nd}$ user interface also comprises means of the electric contact type, for example with a $1^{st}$ part of a plug which can cooperate with a $2^{nd}$ part of the plug which is fixed with respect to the controller or which is located on the controller itself. The $1^{st}$ part can for example be plugged on said $2^{nd}$ part, or said $1^{st}$ and $2^{nd}$ type can be of the plug and socket type. FIG. 3 shows the plugged state of screen 6a on controller 3. The $2^{nd}$ user interface can therefore be physically (including mechanically and electrically) in contact with the controller when the operator so decides. Alternatively, the $2^{nd}$ user interface can be linked to the controller through a wire or a cable (and at least one plug), it is then also considered as being plugged on or with the controller. When the $2^{nd}$ user interface is plugged on or with the controller, information or data can be exchanged between the $2^{nd}$ user interface and the printer controller through the $1^{st}$ part and the $2^{nd}$ part of the plug and/or through at least one wire. In particular the $2^{nd}$ user interface can receive from the controller one or more data to be displayed and/or send to the controller, or provide it with, one or more data or instruction sent further to the operator's selection of a particular button of the $2^{nd}$ user interface, for example a "stop" button.

More generally, the $2^{nd}$ user interface also comprises means to be connected with the controller, through a physical connection or through a wireless connection. Such connections can be for connecting the $2^{nd}$ user interface and the controller through an Ethernet LAN or a WLAN or a Bluetooth connection.

The $2^{nd}$ user interface can be directly connected with the printer (when it is plugged to the printer or connected with it through a cable) or indirectly over a network. In this description, it is often referred to the example of a $2^{nd}$ user interface which is plugged with, or unplugged from, the controller, however these examples can be easily transposed to the case where the $2^{nd}$ user interface is connected (without being plugged) with, or disconnected from, the controller.

When the $2^{nd}$ user interface is connected with the controller, information or data can be exchanged between the $2^{nd}$ user interface and the printer controller through the connection, be it a connection through a plug and/or through at least one wire or cable or a connection through a network, wireless or not. The example of a connection through a "plug" is given below, but it is applicable to the other connections or connection means given above.

The operator can take the $2^{nd}$ user interface, unplug (or disconnect) it from the controller and take it away to perform any task for example close to a production line (see the example of FIG. 11 below) while still seeing the same information displayed, communication being commuted to the wireless type. On FIG. 2 the $2^{nd}$ user interface 6a is represented at some distance from the controller, and is positioned on a stand or support 5a. In a variant, the $2^{nd}$ user interface remains in the hands of the operator who is staying at some distance from the controller 3.

The information displayed on both 1st and $2^{nd}$ interface is generated by the controller 3 and sent to the relevant interface, either though electrical connections (to the $1^{st}$ user interface or to the $2^{nd}$ user interface when it is mechanically and electrically connected to the controller 3) or through wireless connection 600 (to the $2^{nd}$ user interface when it is not mechanically and electrically connected to the controller 3). The controller detects whether the $2^{nd}$ interface is plugged or not and selects the transmission means accordingly.

The information displayed on the $1^{st}$ user interface may depend on the position of the $2^{nd}$ user interface with respect to the controller. When the $2^{nd}$ user interface is plugged on (or connected to) the controller (as on FIG. 3), there is no need to display the same information on both the $1^{st}$ user interface and the $2^{nd}$ user interface. The content of information of both user interfaces can therefore be adapted by the controller.

Figure 4C:
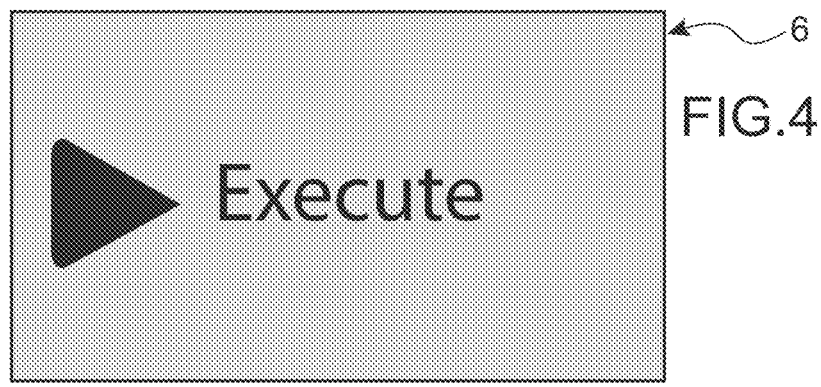
FIG. 4C, respectively 5C, respectively 6C, is an example of a display of information on a $1^{st}$ user interface, when the $2^{nd}$ user interface is plugged on the printer body.

For example, the information displayed on the $1^{st}$ user interface, respectively $2^{nd}$ user interface, is that shown on FIG. 4A, respectively 4B, when the $2^{nd}$ user interface is not plugged on (or not connected to) the controller. When the $2^{nd}$ user interface is plugged on (or connected to) the controller, a $1^{st}$ set of information displayed on the $1^{st}$ user interface is changed or adapted by the controller, so that a 2nd set of information, different from the $1^{st}$ one, is displayed on the $1^{st}$ user interface; according to an example illustrated on FIG. 4C, the $1^{st}$ user interface then only displays a button or a field or an icon indicating the state of the machine; according to a further embodiment, the operator can press on said button or field or icon to implement a further technical function: in this example, the $1^{st}$ user interface displays an information showing that the printer is printing, and by pressing or clicking on the arrow, the printer can be stopped.

Figure 5A:
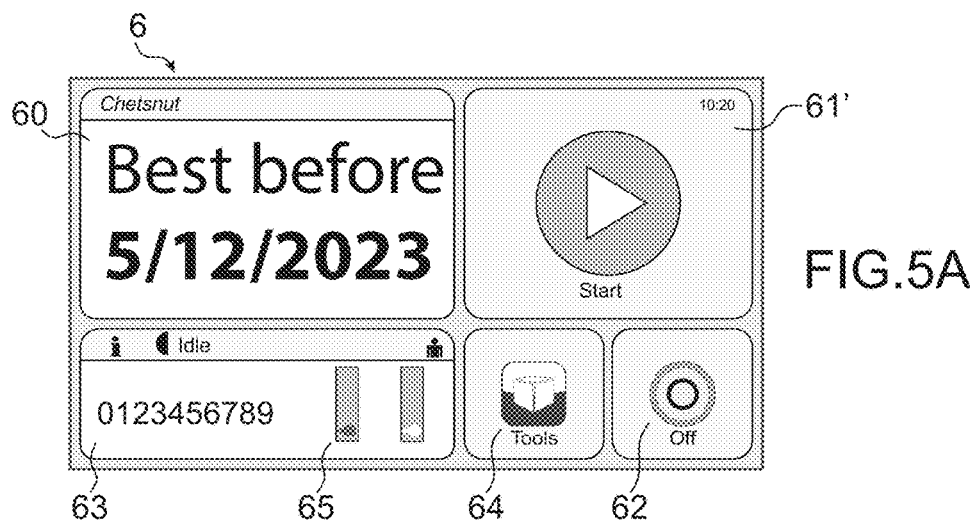
Figure 5B:
Figure 5C:

Another example is illustrated on FIGS. 5A-5C. Most of the features on these figures bear the same reference number as on FIGS. 4A and 4B and designate the same features, for this reason the above explanation of these features will not be repeated. Both information displayed on the $1^{st}$ user interface, respectively $2^{nd}$ user interface, is shown on FIG. 5A, respectively 5B, when the $2^{nd}$ user interface is not plugged on the controller. When the $2^{nd}$ user interface is plugged on the controller, the $1^{st}$ set of information displayed on the $1^{st}$ user interface is adapted or changed by the controller so that a 2nd set of information, different from the $1^{st}$ one, is displayed on the $1^{st}$ user interface; according to an example illustrated on FIG. 5C, the $1^{st}$ user interface then only displays a button or a field or an icon indicating the state of the machine; according to a further embodiment, the operator can press on said button or field or icon to implement a further technical function: in this example, the $1^{st}$ user interface displays an information showing that the printer is stopped, and by pressing or clicking on the arrow, the printer can be started to print.

According to another further example, which is not illustrated on the figures, the button 62, respectively 62a, of the 1st user interface, respectively of the 2nd user interface (see FIGS. 5A and 5B) is the "on" button (the other buttons or fields being the same as on FIGS. 5A and 5B), the 2nd user interface not being plugged on the controller; the 1st user interface displays a "stopped" button when the 2nd user interface is plugged on the controller.

Figure 6A:
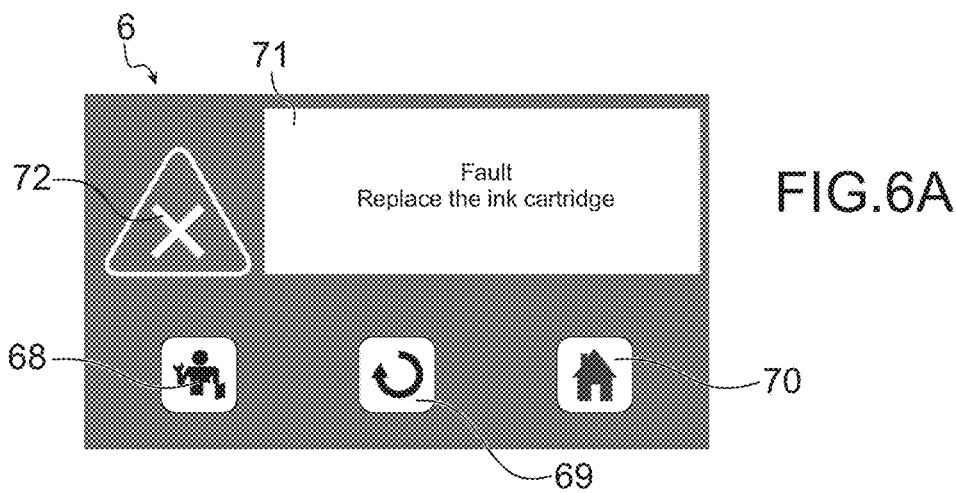
Figure 6B:
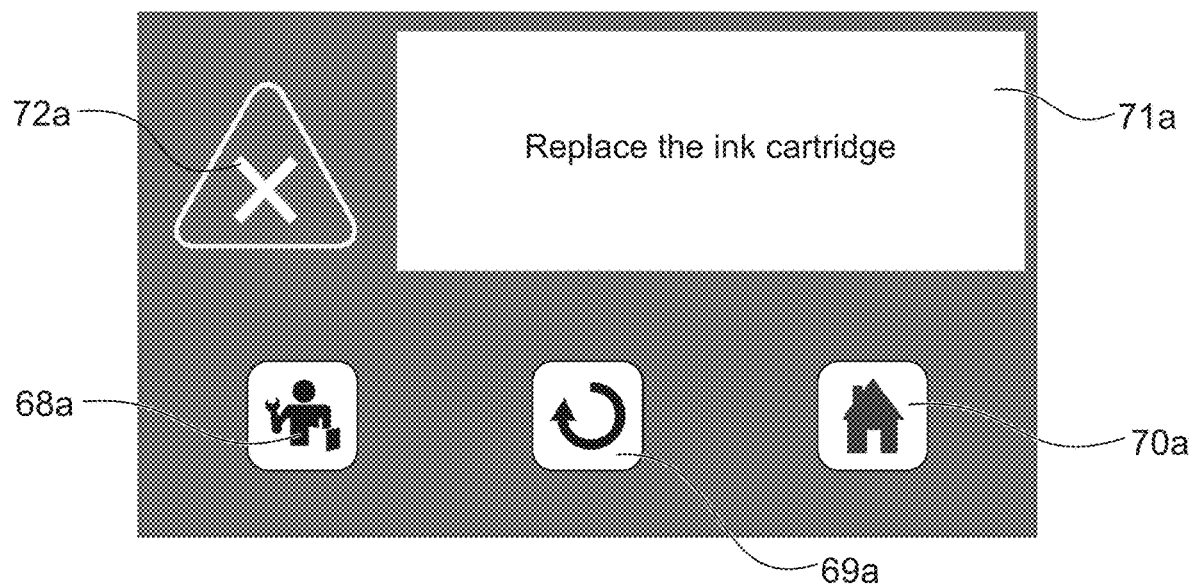
Figure 6C:
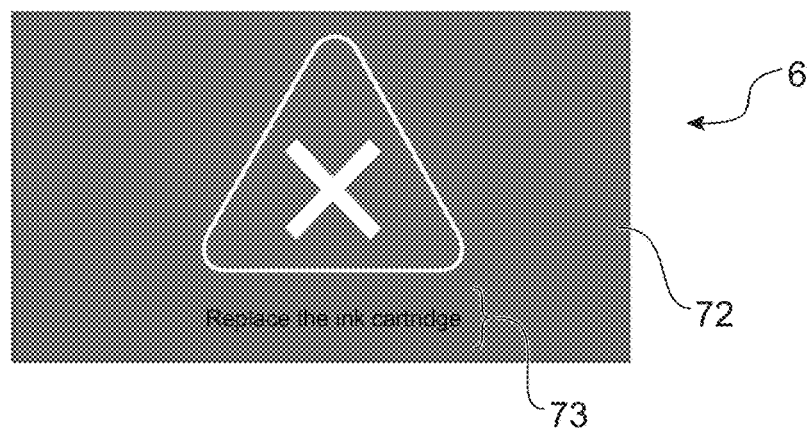

Another example is illustrated on FIGS. 6A-6C. Both information displayed on the 1st user interface 6, respectively the 2nd user interface 6a, is shown on FIG. 6A, respectively 6B, when the 2nd user interface is not plugged on the controller, a button 68, 68a giving the operator the possibility to display further information, for example a guide and/or a button 69, 69a giving the operator the possibility to perform a warning or a fault, for example after he/she has performed a maintenance or has repaired the printer and/or a button 70, 70a giving the operator the possibility to display the home screen (on which a warning can still be displayed, like for example in field 74a of FIG. 7A). These figures are examples of displays when a failure is detected in the machine; a failure message 71, 71a, for example together with a failure signal or pictogram 72, 72a is displayed on both user interfaces. When the 2nd user interface is plugged on the controller, the information displayed on the 1st user interface is adapted by the controller; according to an example illustrated on FIG. 6C, the 1st user interface then only displays a large failure signal 72, with a possible access to further information button or field 73 on which the operator can press to receive further details as to the failure.

The same example can be adapted to a warning message, instead of a failure message, buttons 68, 68a, 69, 69a, 70, 70a, remaining the same as on FIGS. 6A and 6B, the failure message 71, 71a, respectively the failure signal or pictogram 72, 72a of FIGS. 6A and 6B being replaced by a warning message, respectively by a warning signal or pictogram.

In other words, when the 2nd user interface is plugged on the controller, the information displayed on the 1st user interface is adapted by the controller from a 1st set of information to a 2nd set of information, different form the 1st set of information; if a same 1st set of information was displayed on both 1st user interface and 2nd user interface when the 2nd user interface was unplugged, then the same information is no longer displayed both on the 1st user interface and the 2nd user interface after the 2nd user interface is plugged. The information displayed on the 1st user interface can be adapted to display only part of the information displayed on the 2nd user interface. For example the 2nd user interface of FIG. 6C only displays the failure signal which is one of the signals displayed on FIG. 6B. In a variant, the 1st user interface only displays part of information displayed on the 2nd user interface, but said part of the information is made larger on the 1st user interface than on the 2nd user interface so that the operator only sees a limited number of information (but an expanded information) of the 1st user interface.

This feature is useful in that the operator's attention can be focused on an essential information while still keeping most of the information on the 2nd user interface. This is the example of FIGS. 6A-C in which, in the plugged state, the 1st user interface displays an expanded warning pictogram (see FIG. 6C).

Based on the above examples, in particular those discussed in connection with FIGS. 4A-4C, 5A-5C, 6A-6C, one understands that displaying only one button or field or icon indicating the state of the machine (or any other information) can be important when the operator is far away (for example at distance between 2 m or 5 m and 10 m) from the 1st user interface (he is for example close to the printing head), because he can then see this information while having the 2nd user interface which displays other information The following examples are other situations where there is a distance between the controller (where the 1st user interface is located), the print head and the operator and where it can be important for the operator to see the information on the 1st user interface even when he/she is at some distance from it:

- the controller and print head can be on different sides of a conveyor;
- or the controller has several print heads, and the print heads print on different sides of the production line;
- or the controller has several print heads and the print heads print on two different production or packaging lines;
- or the controller is integrated under the conveyor and the print head is located on the conveyor for printing on products.
- or the controller is integrated in a packaging machine or system, and the user and the 2nd interface are located outside the packaging machine or system.

Further examples of this feature of the invention are also given below.

Figure 7A:
FIGS. 7A and 7B are another example of a display of information on a $2^{nd}$ user interface and on a $1^{st}$ user interface when the $2^{nd}$ user interface is unplugged from the printer body.
Figure 7B:
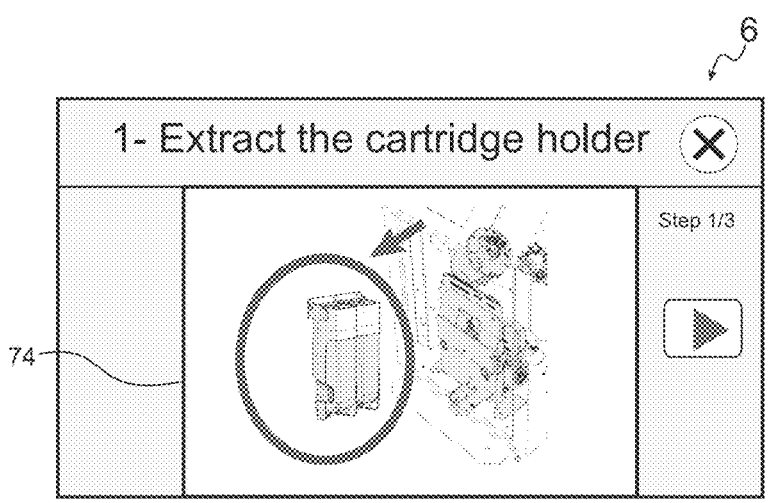

Another example is given on FIGS. 7A and 7B. Most of the features on these figures bear the same reference number as on FIGS. 5A and 5B and designate the same features, for this reason the above explanation of these features will not be repeated. FIG. 7A shows the 2nd user interface when a failure is detected. This screen contains all information of the screen of FIG. 5B, but displays a further warning 74a concerning here a need to replace the ink circuit.

When the 2nd user interface is unplugged from the controller, the information displayed on the 1st user interface is adapted by the controller; according to the example illustrated on FIG. 7B, the 1st user interface then only displays a drawing 74 illustrating how to extract the cartridge holder so as to replace at least part of the ink circuit. The whole information of the 2nd user interface remains unchanged and is still available, but the details concerning the step to be taken in this particular situation are shown at a smaller scale on the 1st user interface. This can also make sense if the 2nd user interface is plugged on the controller: the maintenance instruction could be initiated either on the 1st user interface or on the 2nd user interface by the operator.

Displaying on the 1st user interface only the information relating to how to repair the printer or a spare part of it or change a spare part of it can be important when the operator is not directly in front of the 1st user interface because he/she is repairing the printer or a spare part of it or changing a spare part. For example, a cartridge can be located in the lower part 4' of the body (see FIG. 3) and the operator has to kneel to change the cartridge; in that position he can look at the 1st user interface from below, which will be much easier if the information is displayed on the whole surface of the 1st user interface.

In the above example, the role of both user interfaces can be exchanged: in some situations, it can be useful to show on the 2nd user interface the information relating to how to repair the printer or a spare part of it or change a spare part of it (like on FIG. 7B) and the $1^{st}$ user interface displaying the information of FIG. 7A.

Figure 8A:
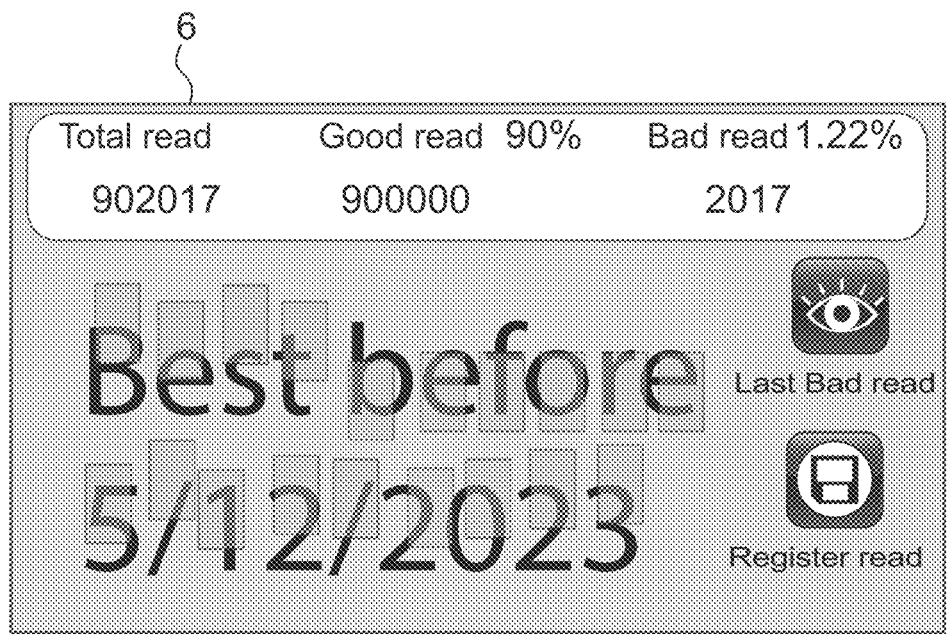
FIGS. 8A and 8B are examples of a display of information on a $1^{st}$ user interface.

Another example is given on FIG. 8A, which shows a display by the $1^{st}$ user interface, the $2^{nd}$ user interface displaying at least an icon showing the possibility to select the implementation of imaging means, for example a camera, to image the printing made or being made. This is the case on each of the examples of FIGS. 4B, 5B, 7A where an icon 90a shows a camera. Selecting or pressing on this icon, the camera starts imaging the products and the images of the products are displayed on the $1^{st}$ user interface as illustrated on FIG. 8A.

This example shows that clicking or selecting an instruction or a button or an icon on the $2^{nd}$ user interface can result in displaying a specific information on the $1^{st}$ user interface. In other words, the information displayed by both screens is interrelated, the controller adapting or changing the information displayed on the $1^{st}$ user interface depending on the information displayed on the $2^{nd}$ user interface but also on the plugged or unplugged state of the $2^{nd}$ user interface.

In another example, the image is displayed by the $2^{nd}$ user interface, the $1^{st}$ user interface displaying at least an icon or a button or a field to adjust the image of one or more parameters of the image (for example contrast), the operator seeing on the $2^{nd}$ user interface the result of this adaptation.

Figure 8B:
Figure 9A:
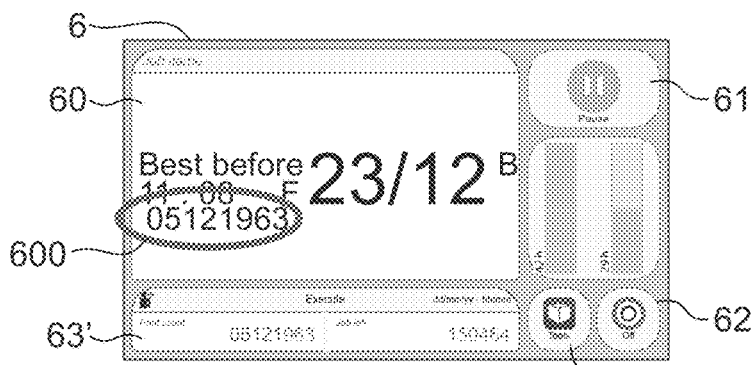
FIGS. 9A-9D are examples of a display of a $1^{st}$ information on a $1^{st}$ user interface.
Figure 9B:
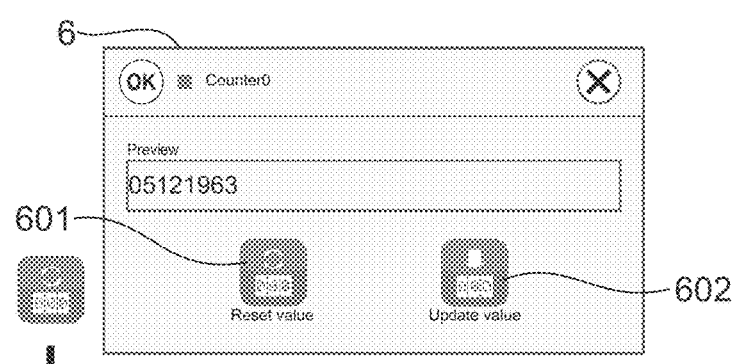
Figure 9C:
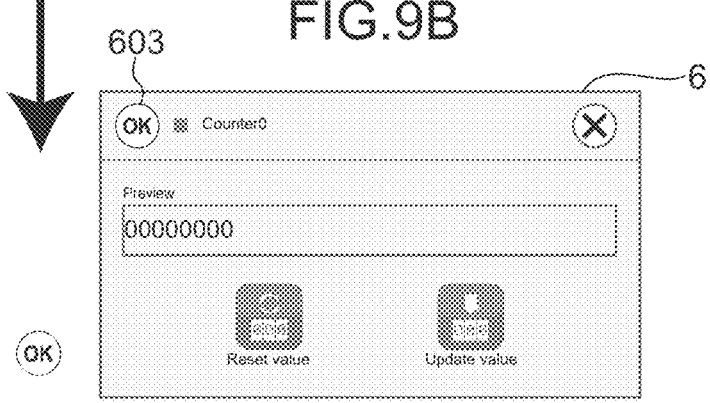
Figure 9D:

Another example of information displayed by the $1^{st}$ user interface is given on FIG. 8B, the $2^{nd}$ user interface displaying for example the information illustrated on FIG. 4A. The $1^{st}$ user interface shows the printer identification (here "P1") on a screen background having a color according to the status of the printer (for example green for a printer printing, white for a printer being stopped and red for a printer having a failure). This is helpful because, here again, an operator can identify the status of the printer although he/she is far from the $1^{st}$ user interface, for example because he is close to another printer.

According to another example, an operator can be close to the print head, adjust printing parameters (for example contrast) with help of the $2^{nd}$ user interface and directly sees the result of adjusting said parameters on the object being printed, which could be very difficult, if not impossible, if the operator remains in front of the $1^{st}$ user interface. As already explained above, the distance between the printing head or the $2^{nd}$ user interface and the controller (and the $1^{st}$ user interface) can be of the order of several meters, for example between 2 m and 10 m or 15 m.

In another example, it is possible to select a button on the $2^{nd}$ user interface to reset a counter on both user interfaces or on the $1^{st}$ user interface. This counter shows for example the number of printings of a same information which have been made on a same batch of products. It is sometimes necessary to reset this number to "0" to start printing on another batch of products. Other information can be concerned by this feature, offering the possibility to adapt the information on one of the user interfaces—for example the $1^{st}$ user interface—from the other user interface—for example the $2^{nd}$ user interface. The controller receives the updated or modified information from the $2^{nd}$ (or other) user interface and adapts the information displayed on the $1^{st}$ (or on said one) user interface, or the $1^{st}$ (or on said one) user interface receives the updated or modified information directly from the $2^{nd}$ (or other) user interface and adapts it. This embodiment can be helpful in particular when both user interfaces are at some distance from each other and there is a need to adapt the information displayed without the operator being physically present near each of the user interfaces or near the user interface where the information is displayed and needs to be adapted.

This example is illustrated on FIGS. 9A-10C, showing the $1^{st}$ user interface 6 and the $2^{nd}$ user interface 6a (in this example, the size of 6a is smaller than the size of screen 6). It is possible to select a button 700 on the $2^{nd}$ user interface 6a (FIG. 10A) to initiate a resetting program of a counter 600 (FIG. 9A) on the $1^{st}$ user interface 6. The selection of button 700 on the $2^{nd}$ user interface 6a results in the $1^{st}$ user interface 6 automatically displaying a specific information relating to this counter, in particular a button or an icon 601 to reset the said counter (FIG. 9B) and/or a button 602 or an icon to update the said counter. FIG. 10B shows the $2^{nd}$ user interface 6a after button 700 has been selected (in this example, button 700 is in a different color showing it has been selected).

The counter is then reset on the $1^{st}$ user interface 6 (FIG. 9C), and the operator can then accept the result, for example by clicking on an "OK" button 603. The $1^{st}$ user interface 6 comes back to its home display (initial state of FIG. 9A), but with an updated counter 600.

Figure 10A:
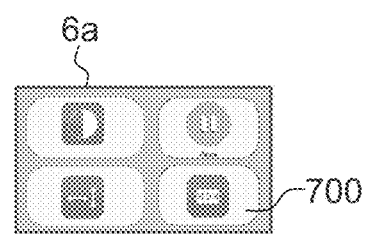
FIGS. 10A-10C are examples of a corresponding display on the $2^{nd}$ user interface.
Figure 10B:
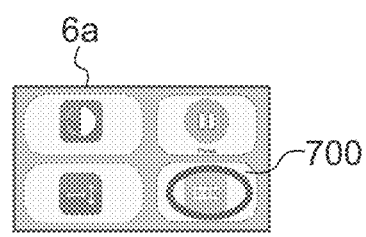
Figure 10C:
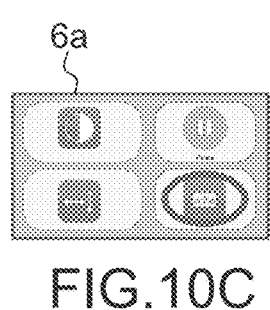

FIG. 10C shows the $2^{nd}$ user interface 6a at the end of this step, button 700 reverting to its initial state (of FIG. 10A). In this example, the operator can start a resetting program from the $2^{nd}$ user interface 6a and then perform the resetting on the $1^{st}$ user interface; this can be convenient since the size of the $2^{nd}$ user interface is smaller than the size of the $1^{st}$ user interface and, for this size reason, not all buttons can be available for resetting on $2^{nd}$ user interface. But in another example, the whole resetting process can be from the $2^{nd}$ user interface, and the result of the resetting can be displayed on both user interfaces.

More generally, one of the user interfaces can comprise means, in particular at least one button or icon, to trigger a program on the other user interface, the operator having then the possibility to enter the data on the $1^{st}$ user interface for performing that program.

A printer according to the invention may therefore comprise means:
  to adapt or update, from one the $1^{st}$ and $2^{nd}$ user interfaces, at least one information displayed on the other one of said $1^{st}$ and $2^{nd}$ interfaces;
  and/or to trigger, from one the $1^{st}$ and $2^{nd}$ user interfaces, at least one program for which data can be entered on the other one of said $1^{st}$ and $2^{nd}$ interfaces.

Figure 11A:
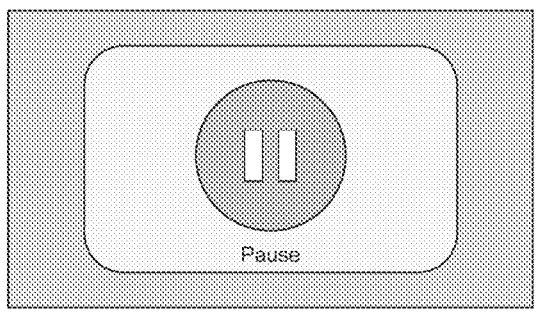
FIGS. 11A-11D are examples of a display of a $1^{st}$ information on a $1^{st}$ user interface.

Another example is given on FIG. 11A which illustrates the $1^{st}$ user interface when the $2^{nd}$ user interface is unplugged from the controller and displays information according to FIG. 4A. Here the $1^{st}$ user interface only displays the "pause" symbol or pictogram, corresponding with field 61a of FIG. 4B.

Figure 11B:
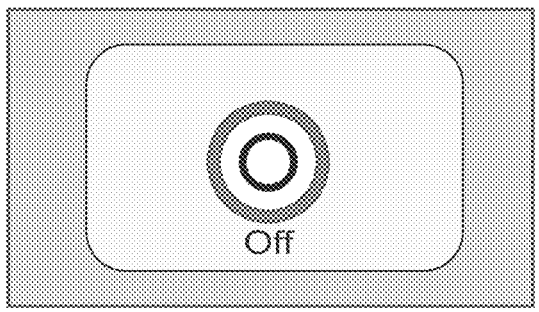

In a variant, illustrated on FIG. 11B, the $1^{st}$ user interface only displays the "off" symbol or pictogram, corresponding with field 62a of FIG. 4B.

Figure 11C:
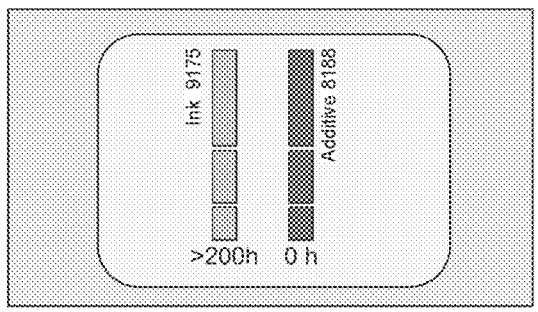

In a further variant, illustrated on FIG. 11C, the $1^{st}$ user interface only displays the filling status of the cartridges (level of ink, respectively solvent, in the ink cartridge, respectively solvent cartridge), corresponding with field 65a of FIG. 4B.

Figure 11D:
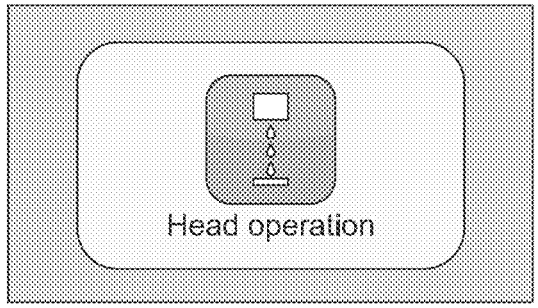

In a further variant, illustrated on FIG. 11D, the $1^{st}$ user interface only displays the head operation being performed; a head operation is an operation of maintenance of the head, for example purging the print head to clear it from debris and/or from ink, or a print head calibration.

Figure 12A:
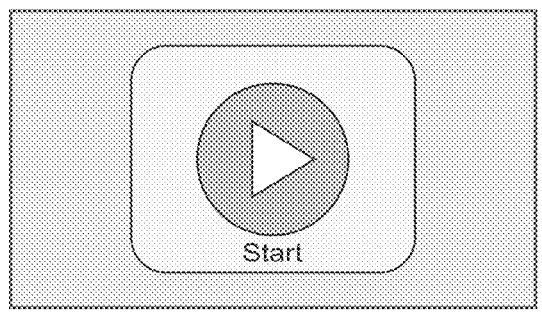
FIGS. 12A-12D are examples of a display of a further information on said $1^{st}$ user interface, after the information of FIGS. 11A-11D.

If the operator selects the button "pause" of FIG. 11A, a button proposing a next step can be displayed on the $1^{st}$ user interface, for example a button "start" as illustrated on FIG. 12A.

Figure 12B:
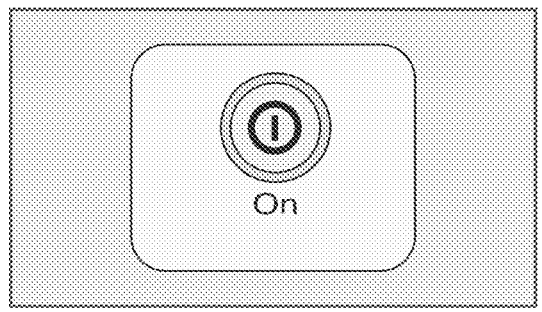

If the operator selects the button "off" of FIG. 11B, a button proposing a next step can be displayed on the $1^{st}$ user interface, for example a button "On" as illustrated on FIG. 12B.

Figure 12C:
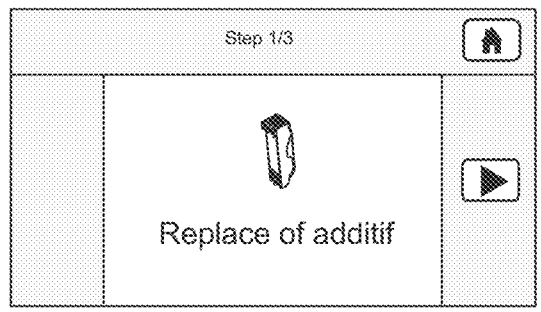

If the operator presses on an icon showing a cartridge which needs to be replaced or refilled (FIG. 11C), a button showing the exact step to make can be displayed on the $1^{st}$ user interface, for example a button "replace of solvent" as illustrated on FIG. 12C.

Figure 12D:
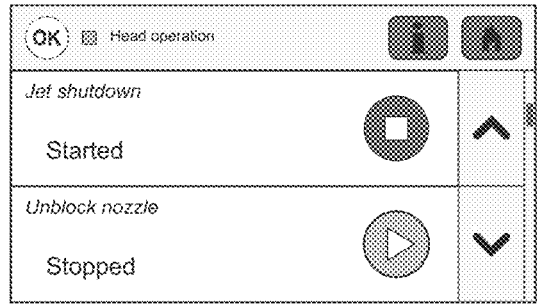

If the operator presses on an icon showing a "head operation (FIG. 11D), a button or a field showing the list of possible maintenance actions for the head (check stability and/or introduction of additive, and/or unblock nozzle, ad/or point break adjustment etc) can be displayed on the $1^{st}$ user interface. The status of one or several action(s) can also be displayed ("start" or "stop"), for example a button "start" the "unblock nozzle" operation can be displayed as illustrated on FIG. 12D.

This embodiment offers the operator the possibility to select a large button or control field on the $1^{st}$ user interface while still having a full range of other information on the $2^{nd}$ user interface.

According to a further aspect of the invention, displaying the same information on both the $1^{st}$ user interface and the $2^{nd}$ user interface when the $2^{nd}$ user interface is not plugged on the controller can prove useful if an operator holding the $2^{nd}$ user interface is in a position from which he cannot see the $1^{st}$ user interface, for example because he is too far away from the controller and/or because his field of view cannot reach the $1^{st}$ user interface. This situation is illustrated on FIG. 13, where the controller is represented from above, near a production line, here a conveyor 80 transporting goods 81a, 81b, 81c . . . to be printed with help of the print head 1 connected to the controller through the umbilical 19. An operator is away from the controller and looks in the direction illustrated by arrow 610a, at the $2^{nd}$ user interface 6a. In such situation the operator still sees the information he needs, while the $1^{st}$ user interface 6 is still displaying information (which however cannot be seen by the operator). This can be particularly useful for example when the operator is on the other side of the conveyor than the controller 3.

According to a further aspect of the invention, 2 printers are working, for example on different conveyors 80, 180, as illustrated on FIG. 14A where the two controllers of both printers are represented from above, each near a production line, conveyor 180 transporting goods 181a, 181b, 181c . . . to be printed with help of the print head 101 connected to the controller 130 (which has $1^{st}$ user interface 160) through the umbilical 119. The references for the other controller and conveyor are the same as on FIG. 11 and designate the same elements.

Depending on which controller 3, 130, the $2^{nd}$ user interface is closer (technical means implemented in this user interface and, for example, the controller(s) to measure the distance from the $2^{nd}$ user interface to the controller(s) or to a specific location of any printer or to each of the printers can involve wireless technologies, like for example NFC, Bluetooth, WiFi), it will display information relating either to the $1^{st}$ printer 1-3-19 or to the $2^{nd}$ printer 101-130-119. The $2^{nd}$ user interface communicates through wireless communication means with the $1^{st}$ printer when it is closer to the $1^{st}$ printer and with the $2^{nd}$ printer when it is closer to the $2^{nd}$ printer. Alternatively, the $2^{nd}$ user interface can offer to the operator the possibility to select which printer he wants to control, or the printer the technical parameters of which he wants to display, regardless of the distance. The $2^{nd}$ user interface preferably has a processor. In an embodiment, the operator can manually select a printer from a list of available printers, or a selection of a printer is made automatically based on proximity to a wireless enabled printer using for example wireless technology such as NFC, Bluetooth or WiFi.

If the $2^{nd}$ user interface is plugged on one of the controllers, then it communicates with this controller through the plug and electrical communication means as already explained above. In both cases, the $1^{st}$ user interface and the $2^{nd}$ user interface display information according to the invention, as explained above. On FIG. 14, the $2^{nd}$ user interface 6a is closer to the $2^{nd}$ printer and will display information relating to the $2^{nd}$ printer 101-130-119 as explained above, depending on whether it is plugged on it or not. The information displayed in this case can be different from the information displayed when the $2^{nd}$ user interface 6a is closer to the 1st printer because both printers can be in different states, for example one of them needing a refill of its solvent or ink cartridge but not the other one.

The system illustrated on FIG. 14 could also comprise a $3^{rd}$ printer and a $3^{rd}$ conveyor, in which case the same $2^{nd}$ user interface could be used for all 3 conveyors and printers.

In a further example of the LCIJ (or "valvejet", see FIG. 16C) or TIJ type, the system illustrated on FIG. 14 comprises a $3^{rd}$ printer and a $3^{rd}$ conveyor and a $4^{th}$ printer and a $4^{th}$ conveyor, in which case the same $2^{nd}$ user interface could be used for all 4 conveyors and printers.

In another example of application, the $1^{st}$ user interface is switched off because the power must be switched off in view of a failure of the hydraulic system or because part of it must be repaired or changed. This is in particular the case when the printer is a CIJ printer where the controller or the body to which the $1^{st}$ user interface is fixed also hosts hydraulic components or circuits. The information relating to the repair(s) which must be done can be displayed on the $2^{nd}$ user interface. In one embodiment the 2nd user interface has its own processor and can display the instructions autonomously from the controller. In another embodiment the information relating to the repair(s) can be downloaded from a server separate from the $1^{st}$ user interface or it is sent to the $2^{nd}$ user interface.

The invention is explained above for an inkjet printer, for example a CIJ inkjet printer. Such a CIJ printer has for example a structure as explained above in connection with FIG. 1A and a print head as explained above in connection with FIG. 1B. But it can also be implemented in combination with another kind of printer, for example a laser printer, or a TIJ (Thermal inkjet) printer or a "print and apply" printer (where a label is printed and then applied to a product) or a DOD ("drop on demand") printer or a "valvejet" printer. Each of these printers has technical features and technical information or parameters relevant to each of said printers can be displayed on a $1^{st}$ user interface display and a $2^{nd}$ user interface display as explained above. For example, in the case of a laser printer, the laser filter status can be such a parameter, or the ribbon length for a TTO printer.

Figure 16A:
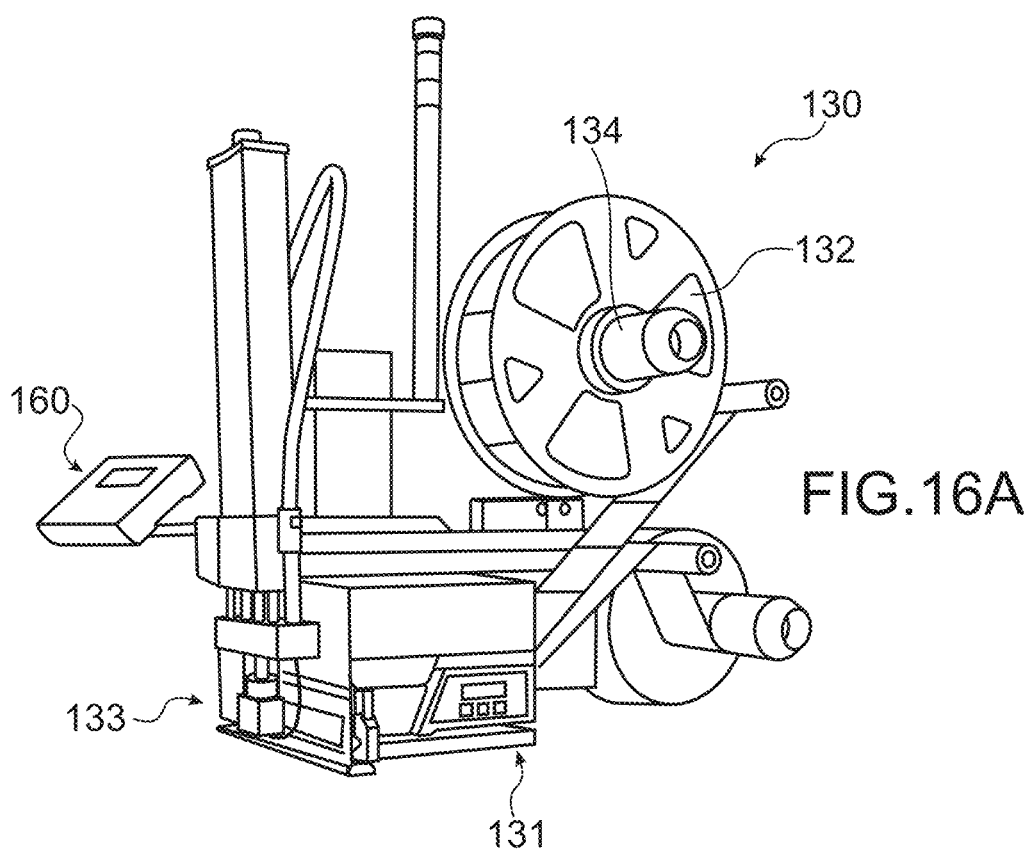
FIGS. 16A-16C are examples of different kinds of printers which can be implemented according to the invention.

An example of a "print and apply" printer 130 (where a label is printed and then applied to a product) is represented on FIG. 16A and comprises a section 131 or means (based for example on thermal printing) for printing information on labels from a ribbon 132 and a section 133 or means for sticking one or several labels on an object or a surface of a packaging. Said section 133 or means for sticking comprise for example with a plunger or a tamping machine or with a hydraulic circuit for generating pulsated air. A ribbon 132 can be loaded on a ribbon core 134, is then guided to the printing section 131 and further to the section 133 for sticking the labels on a surface, for example a container or a packaging. The printer also includes a controller, and a user interface 160 (both of which can be integrated in the printer), said user interface 160 corresponding to the $1^{st}$ user interface according to the invention.

Figure 16B:
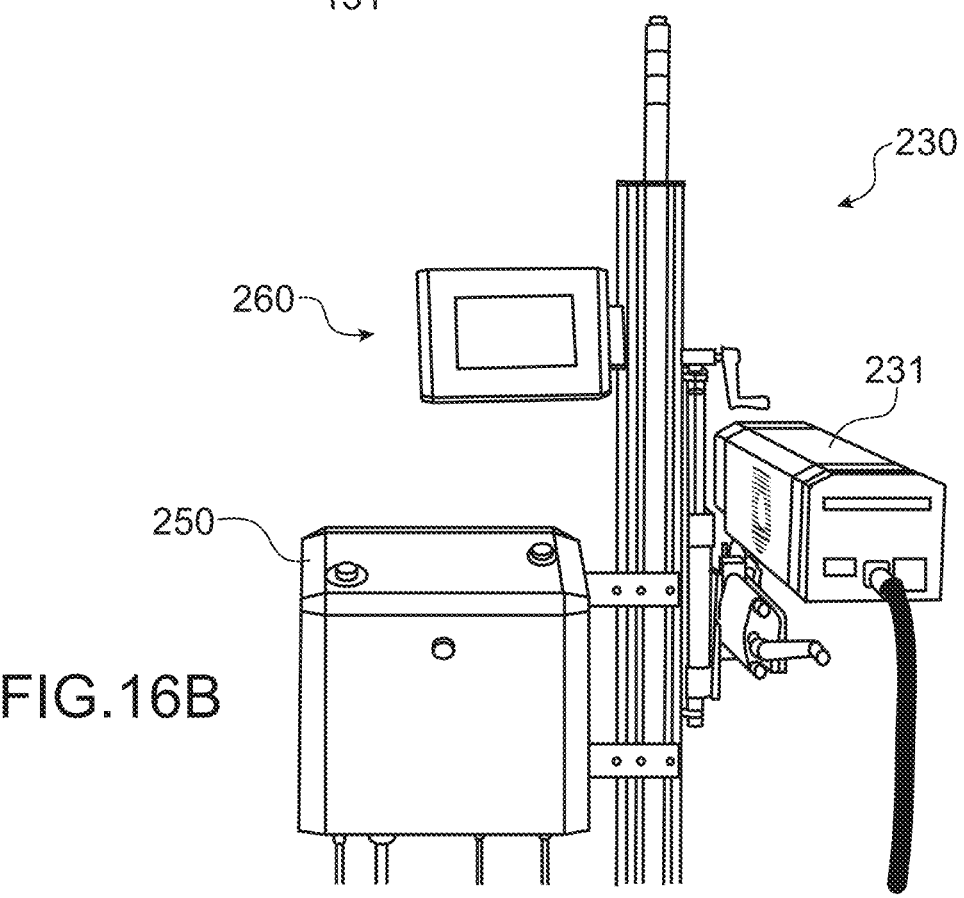

An example of a laser printer 230 is represented on FIG. 16B and comprises a laser head section 131 for printing information on a surface, a controller 250 (which controls in particular the parameters of the laser) and a user interface 260, corresponding to the $1^{st}$ user interface according to the invention.

Figure 16C:
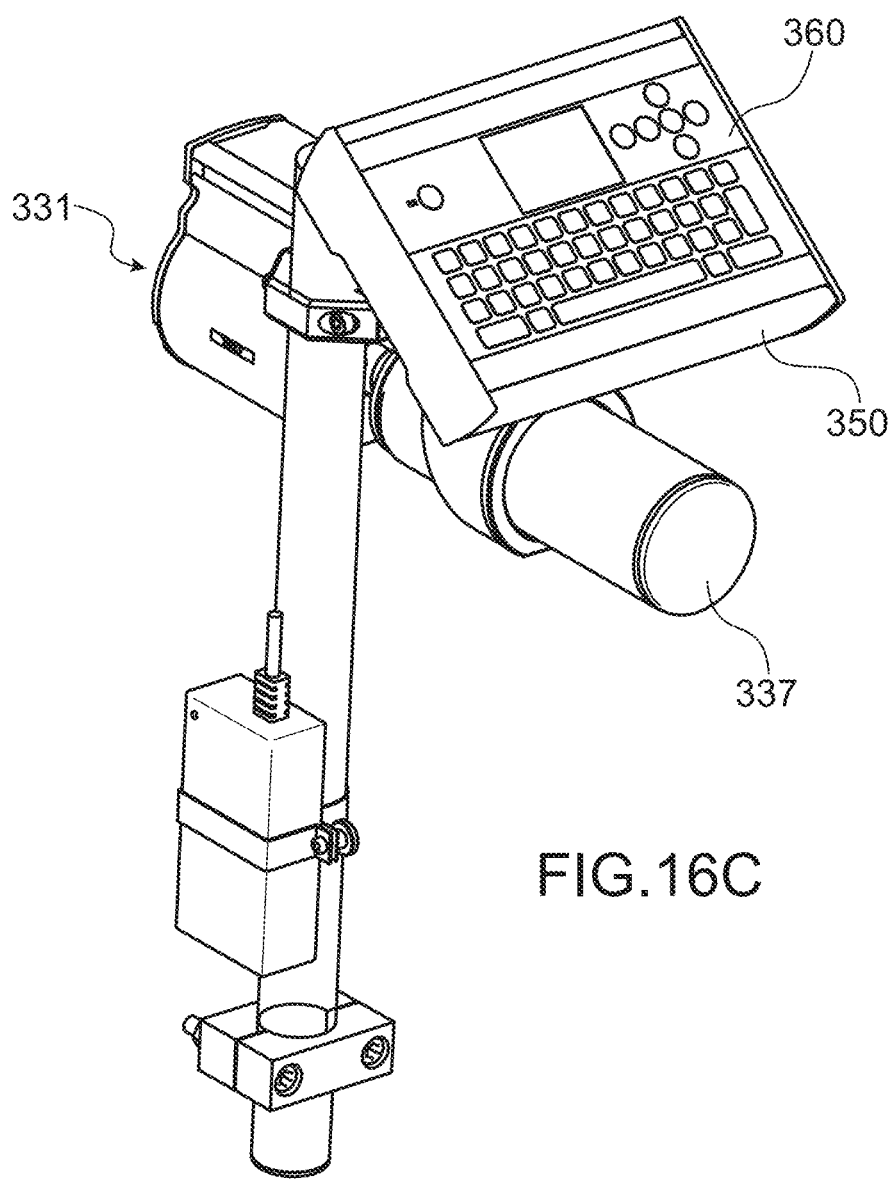

An example of a "valvejet" printer 330 is represented on FIG. 16C and comprises a printhead 331 (of the "drop on demand" ink jet type) controlled by a controller 350 and a user interface 360 (which can be both combined) said user interface 360 corresponding to the $1^{st}$ user interface according to the invention. An ink cartridge 337 can be connected to the printhead 331.

An example of a thermal transfer printer is disclosed in U.S. Pat. No. 9,145,020 and includes a plurality of printing elements controlled by a controller and a user interface, corresponding to the $1^{st}$ user interface according to the invention.

Another example of a thermal transfer printer is disclosed in U.S. Pat. No. 7,372,475 and includes a thermal print head controlled by a controller and a display device or user interface, corresponding to the $1^{st}$ user interface according to the invention.

In both documents, the print head or the printing elements transfer(s) a marking medium from a web to a substrate. A ribbon can be loaded in a ribbon cassette, as for example disclosed in U.S. Pat. No. 8,665,301. Ribbon tension and ribbon speed can be controlled and the thermal control on the print head can be controlled to transfer the ink from the ribbon to the material to which it is to be applied. In an embodiment the melted portion of the ribbon stays glued to the material on which the print is applied.

A drop on demand printer is disclosed in U.S. Pat. No. 4,584,590 and can be implement in a device and a method according to the invention.

A thermal ink jet printer is disclosed in U.S. Pat. No. 4,490,728 and can be implement in a device and a method according to the invention.

Another ink-jet head structure is disclosed in U.S. Pat. No. 5,605,659 and can be implement in a device and a method according to the invention.

In all said devices a controller can control the printing system and a user interface, corresponding to the $1^{st}$ user interface according to the invention, can be implemented.

The example of FIG. 14 concerns 2 printers of the same kind: both are CIJ printers (a CIJ printer has for example a structure as explained above in connection with FIG. 1A and a print head as explained above in connection with FIG. 1B). According to a further aspect of the invention, 2 printers of different kinds can be implemented, for example a CIJ printer and a laser printer. This embodiment is illustrated on FIG. 15, where two different conveyors 80, 280 are represented. The conveyor 80 and its printer 1-3-19 are the same as discussed above in connection with FIG. 13. The other conveyor 280 has a laser printer 230 (emitting a laser beam 231). Each printer has its own controller 3, resp. 233, both represented from above on FIG. 15, each near a production line, conveyor 280 transporting goods 281a, 281b, 281c . . . to be printed with help of the laser printer and its controller 230 (which has $1^{st}$ user interface 260). The references for the other controller and conveyor are the same as on FIG. 13 and designate the same elements.

A CIJ printer has for example a structure as explained above in connection with FIG. 1A and a print head as explained above in connection with FIG. 1B.

Depending on which controller 3, 230, the $2^{nd}$ user interface 6a is closer, it will display information relating either to the $1^{st}$ printer 1-3-19 or to the $2^{nd}$ printer 230. The $2^{nd}$ user interface communicates through wireless communication means with the $1^{st}$ printer when it is closer to the $1^{st}$ printer and with the $2^{nd}$ printer when it is closer to the $2^{nd}$ printer. Alternatively, the $2^{nd}$ user interface can offer to the operator the possibility to select which printer he wants to control, or the printer the technical parameters of which he wants to display, regardless of the distance. If the $2^{nd}$ user interface is plugged on or with one of the controllers, then it communicates with this controller through the plug and electrical communication means as already explained above. In both cases, the $1^{st}$ user interface and the $2^{nd}$ user interface display information according to the invention, as explained above. On FIG. 15, the $2^{nd}$ user interface 6a is closer to the laser printer and will display information relating to the $2^{nd}$ printer 230 as explained above, depending on whether it is plugged on it or not. The information displayed in this case will be different from the information displayed when the $2^{nd}$ user interface 6a is closer to the $1^{st}$ printer because both printers are of different kinds and their corresponding technical information is not the same.

Preferably, in any embodiment of the invention, the control means, or controller, 3 may comprise a processor or microprocessor, or an electrical or electronic circuit programmed to implement a method according to the invention or one or several steps according to the invention. These means may also control the printing operations, for example, in a CIJ printer, the opening and the closing of each valve of the hydraulic circuit, as well as the activation of the pumping means, in order to circulate ink and/or solvent. It also memorises data, for example ink and/or solvent level measurement data, and may also possibly process these data.

In particular, in some embodiments, the $2^{nd}$ user interface also has a processor or microprocessor, or an electrical or electronic circuit programmed to implement a method according to the invention or one or several steps according to the invention.

What is claimed is:

1. A printer comprising a controller to control printing operations, said controller comprising:
   a first user interface and at least one second user interface;
   a connection to connect the second user interface with the controller and a wireless interface for exchanging data between the second user interface and the controller when the second user interface is not connected with the printer, said controller being programmed to:
   detect whether the second user interface is connected or not with the printer;
   display a different information on at least the first user interface depending on whether the second user interface is connected or not with the printer.

2. A printer according to claim 1, said controller being programmed to display on the first user interface at least part of the information displayed on the second user interface when the second user interface is not connected with the printer.

3. A printer according to claim 2, said controller being programmed to display on the first user interface only part of the information displayed on the second user interface when the second user interface is connected with the printer, said part of the information being displayed with a different size on the first user interface and on the second user interface.

4. A printer according to claim 1, said controller being programmed to display on the first user interface at least one different information than the information displayed on the second user interface when the second user interface is connected with the printer.

5. A printer according to claim 1, said controller being programmed to display on one of said first and second user interfaces an information relating to at least one consumable material, the other one of said first and second user interfaces displaying how to replace said consumable material or at least one part of the printer containing said consumable material.

6. A printer according to claim 5, said consumable material being ink or solvent or a part of the printer, for example a valve or a pump of a hydraulic circuit of the printer.

7. A printer according to claim 1, said controller being programmed to display on one of said first and second user interfaces an information relating to at least one machine vision device, to image a printing made or being made, and to display on the other one of said first and second user interfaces images, from said at least one machine vision device, of a printing made or being made.

8. A printer according to claim 7, at least one of said first and second user interfaces displaying zones or buttons to provide at least one adjustment of an image displayed.

9. A printer according to claim 1, said controller being programmed to display on one of said first and second user interfaces an information relating to a failure or a defect or a fault of the printer, and to display on the other one of said first and second user interfaces information as to how to eliminate or repair said failure or defect or fault.

10. A printer according to claim 1, said printer being a continuous inkjet printer or a laser printer, or a thermal inkjet printer or a "print and apply" printer or a drop on demand printer or a valvejet printer.

11. A printer according to claim 1, said printer being configured or comprising means:
to adapt or update, from one the first and second user interfaces, at least one information displayed on the other one of said first and second interfaces;
and/or to trigger, from one the first and second user interfaces, at least one program for which data can be entered on the other one of said first and second interfaces.

12. A printer system comprising at least a first printer and a second printer, each of them being a printer according to claim 1, said second user interface being common to both printers and displaying an information relating to the first printer, respectively to the second printer, when it is closer to said first printer, respectively to said second printer or said second user interface being configured, or comprising means, to select one of said printers and to display an information relating to said selected printer.

13. A method to work a printer comprising a controller to control printing operations, a first user interface and at least one second user interface, a connection to connect the second user interface with the controller and a wireless interface for exchanging data between the second user interface and the controller when the second user interface is not connected with the printer, said method comprising:
detecting whether the second user interface is connected or not with the printer;
displaying a different information on at least the first user interface depending on whether the second user interface is connected or not.

14. A method according to claim 13, the first user interface displaying:
at least part of the information displayed on the second user interface when the second user interface is not connected with the printer;
or only part of the information displayed on the second user interface when the second user interface is connected with the printer, said part of the information being displayed with a different size on the first user interface and on the second user interface;
or at least one different information than the information displayed on the second user interface when the second user interface is connected with the printer.

15. A method according to claim 13, the second user interface, respectively the first user interface, displaying an information relating to at least one consumable material, the first user interface, respectively the second user interface, displaying how to replace said consumable material or at least one part of the printer containing said consumable material.

16. A method according to claim 13, said second user interface displaying an information relating to at least one machine vision device, imaging a printing made or being made, and the first user interface displaying images of a printing made or being made.

17. A method according to claim 13, one of said user interfaces displaying an information relating to a failure or a defect or a fault of the printer, and the other user interface displaying information as to how to eliminate or repair said failure or defect or fault.

18. A printer comprising a controller to control printing operations, a first user interface and at least one second user interface, means to connect the second user interface with the controller and wireless means for exchanging data between the second user interface and the controller when the second user interface is not connected with the printer, said controller being programmed to:
detect whether the second user interface is connected or not with the printer;
display a different information on at least the first user interface depending on whether the second user interface is connected or not with the printer.

* * * * *